(12) United States Patent
Theopold et al.

(10) Patent No.: US 10,985,599 B2
(45) Date of Patent: Apr. 20, 2021

(54) METHOD FOR PREPARING AN EMERGENCY ENERGY STORE FOR OPERATION

(71) Applicant: General Electric Renovables Espana, S.L., Barcelona (ES)

(72) Inventors: Tobias Theopold, Dortmund (DE); Thomas Wiesenthal, Arnsberg (DE); Bjorn Schreiner, Schwerte (DE)

(73) Assignee: General Electric Renovables Espana, S.L., Barcelona (ES)

( * ) Notice: Subject to any disclaimer, the term of this patent is extended or adjusted under 35 U.S.C. 154(b) by 630 days.

(21) Appl. No.: 15/510,577

(22) PCT Filed: Aug. 21, 2015

(86) PCT No.: PCT/EP2015/069287
§ 371 (c)(1),
(2) Date: Mar. 10, 2017

(87) PCT Pub. No.: WO2016/037834
PCT Pub. Date: Mar. 17, 2016

(65) Prior Publication Data
US 2017/0264137 A1 Sep. 14, 2017

(30) Foreign Application Priority Data
Sep. 10, 2014 (EP) .................. 14184278.1

(51) Int. Cl.
*H02J 9/06* (2006.01)
*H02J 9/00* (2006.01)
(Continued)

(52) U.S. Cl.
CPC .............. *H02J 9/06* (2013.01); *F03D 7/0224* (2013.01); *F03D 9/11* (2016.05); *H02J 3/386* (2013.01);
(Continued)

(58) Field of Classification Search
CPC ................. H02J 3/383; H02J 3/32; H02J 9/06
See application file for complete search history.

(56) References Cited

U.S. PATENT DOCUMENTS 5,362,942 A * 11/1994 Vanderslice, Jr. ........ H02J 7/00
219/209
8,513,829 B1 * 8/2013 Wells ..................... B60L 50/30
307/9.1
(Continued)

FOREIGN PATENT DOCUMENTS

CA      2448536 A1    12/2002
DE  102013218069 A1    3/2014
(Continued)

OTHER PUBLICATIONS

International Search Report and Written Opinion of the International Searching Authority (European Patent Office) (14 pages) dated Oct. 26, 2016.

*Primary Examiner* — Alfonso Perez Borroto
(74) *Attorney, Agent, or Firm* — Dority & Manning, P.A.

(57) ABSTRACT

Described and shown is a process for preparing an emergency energy storage device, with at least one energy storage element for operation, whereby the emergency energy store is designed to provide emergency electrical energy for at least one energy consumer, whereby the energy ($E_L$) which can be drawn from the emergency energy storage and/or the peak output ($P_{max}$) which can be drawn from the emergency energy storage is determined and the operational readiness is established as soon as the energy ($E_L$) which can be drawn from the emergency energy storage and/or the peak output ($P_{max}$) which can be drawn from the emergency energy storage has reached a definable minimum energy value. A process for preparing an emergency energy storage device for operation in which the emergency energy storage is discharged via a discharging device and the heat occurring (Continued)

Figure 1:
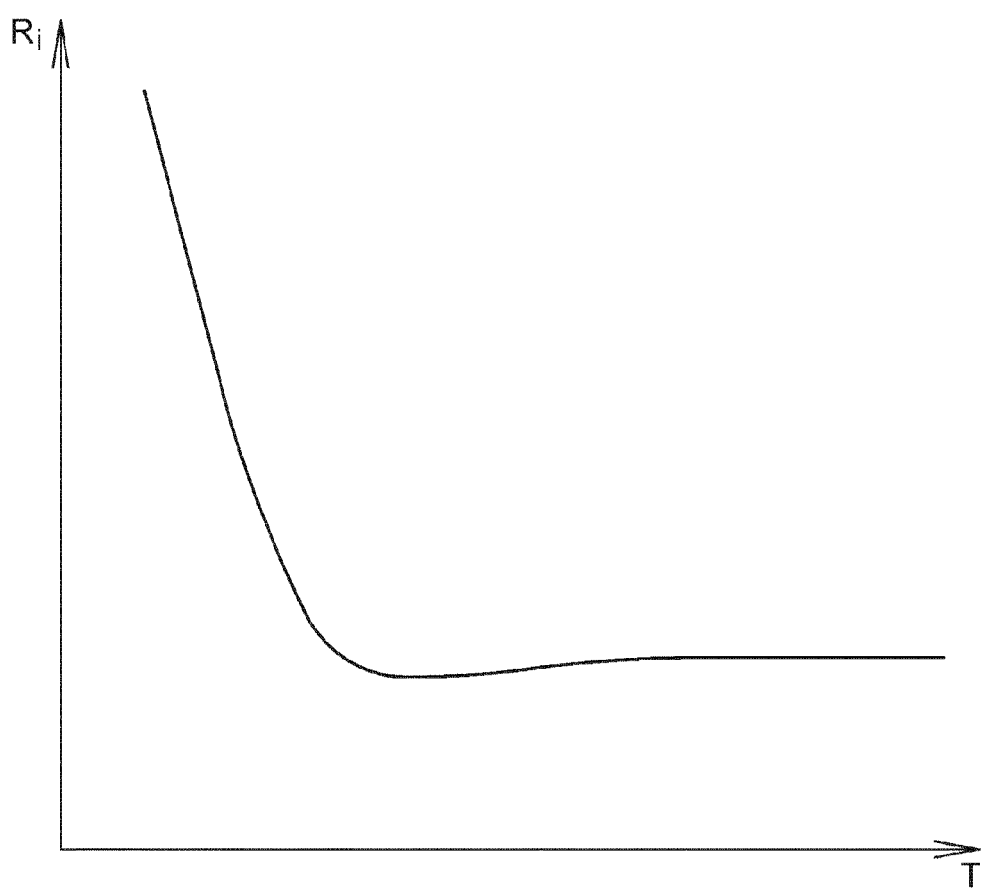

at the internal resistance ($R_i$) is used to heat the emergency energy storage device.

13 Claims, 3 Drawing Sheets

(51) Int. Cl.
*F03D 9/11* (2016.01)
*F03D 7/02* (2006.01)
*H02J 3/38* (2006.01)

(52) U.S. Cl.
CPC ........... *H02J 9/002* (2013.01); *F05B 2260/42* (2013.01); *F05B 2260/70* (2013.01)

(56) References Cited

U.S. PATENT DOCUMENTS

| | | | | |
|---|---|---|---|---|
| 2006/0171086 | A1* | 8/2006 | Hennessy | H02J 3/32 361/62 |
| 2009/0086520 | A1* | 4/2009 | Nishimura | H02M 3/33576 363/133 |
| 2012/0133333 | A1* | 5/2012 | Morioka | B60L 11/1862 320/134 |
| 2012/0153877 | A1 | 6/2012 | Baba et al. | |
| 2013/0088010 | A1* | 4/2013 | Ahnert | F03D 7/0224 290/44 |
| 2014/0139191 | A1* | 5/2014 | Asghari | H02J 3/386 320/134 |

FOREIGN PATENT DOCUMENTS

| | | |
|---|---|---|
| EP | 1908622 A1 | 4/2008 |
| EP | 2578876 A1 | 4/2013 |

\* cited by examiner

METHOD FOR PREPARING AN EMERGENCY ENERGY STORE FOR OPERATION

The invention relates to a process for preparing an emergency energy store for having at least one energy storage element for operation, whereby the emergency energy store is designed to provide emergency electrical energy, for at least one energy consumer, whereby the energy $E_L$ which can be drawn from the emergency energy store and/or the peak output $P_{max}$ which can be drawn from the emergency energy store is determined and the operational readiness is established as soon as the energy $E_L$ which can be drawn from the emergency energy store and/or the peak output $P_{max}$ which can be drawn from the emergency energy store have/has reached a defined minimum output value.

The invention further relates to a process for preparing a pitch system for a wind turbine system for operation, whereby the pitch system has at least one emergency energy store, with at least one energy storage element. The invention additionally relates to a computer program product with program instructions for executing the process, according to the invention. The invention further relates to a pitch system for a wind turbine system, whereby the pitch system has at least one emergency energy store with at least one energy storage element. The invention additionally relates to a wind turbine system with such a pitch system.

Emergency energy storage devices for supplying energy of energy consumers with electrical energy are used in many areas. Normally, the emergency energy to supplying energy consumers is relevant to safety. Examples of such type of safety-relevant energy consumers are, in particular, motors in elevators or the pitch system in a wind turbine system.

When there is the failure of an external grid, as can occur, for example, in a building fire, it is necessary that the elevators are capable of moving to the next floor and opening the doors without the energy provided by the external grid, so that anyone currently in the elevator can be brought to safety.

Modern wind turbine systems are normally equipped with electrical pitch systems, which have at least one electric motor per rotor blade, characterized as a pitch motor. By rotating the rotor blades around their respective longitudinal axis, such pitch systems regulate the position of the rotor blades with respect to the wind and are often the only safe option for bringing the rotor of a wind turbine system to a stop. This occurs as the pitch system rotates the rotor blades in the so-called vane position and the rotor, in the absence of a drive, stops due to the wind. The energy supply of the pitch system takes place typically through the grid, into which the wind turbine system also supplies the generated current. In the event of a grid failure, a hazardous situation can result, for example, by wind increases, where the rotational speed of the rotor of the wind turbine system exceeds a permissible maximum value and the wind turbine system could become damaged or persons in the vicinity could become injured as a result.

In order to prevent such type of hazardous situation, even in the event of a grid failure, the rotor blades must also be movable into the vane position, even without the energy supply of the pitch system by the external grid. To this end, the pitch system equipped with one or more emergency energy storage devices which ensure the energy supply of the pitch system and, thus, the usage capacity of the pitch system in the event of grid failure, at least until the rotor blades have been placed into the safe vane position, is known from the prior state of the art.

In order to be able to execute the described measures during an emergency situation, without energy supply by the grid, the energy consumer must be able to draw a minimum energy quantity and/or a minimum output from the emergency energy storage device.

During the drawing of energy from an emergency energy storage device, there are always losses $E_V$, which essentially relate back to the internal resistance $R_i$ of the emergency energy storage. Consequently, the energy $E_C$ stored in the emergency energy storage is equal to the total of the losses $E_V$ and the drawable energy $E_L$:

$$E_C = E_V + E_L$$

This means that the drawable energy $E_L$ is the energy that can be effectively provided to the energy consumer after discounting the unavoidable losses $E_V$.

The drawable energy $E_L$ depends on the assumed load current curve I(t) during an emergency situation, wherein the load current curve I(t) indicates the current that is drawn from the emergency energy storage by the energy consumer in an emergency situation. Thus, the drawable energy $E_L$ can approximately be stated as the difference from the stored energy $E_C$ and the time integral of the product of the internal resistance $R_i$ and the square of the load current curve I(t):

$$E_L = E_C - E_V \approx E_C - \int_{t_0}^{t_1} R_i I^2(t) dt$$

The limits of the integral and, in turn, the start time $t_0$ from which the energy consumer draws energy from the emergency energy storage device in an emergency situation and the end time $t_1$ from which the energy consumer no longer draws any energy from the emergency energy storage device. The approximation in this calculation consists of other losses than those occurring at the internal resistance $R_i$ of the emergency energy storage device being ignored.

In order to determine the drawable energy $E_L$, thus only the energy stored in the emergency energy storage device, the internal resistance $R_i$, and the assumed load current curve I(t) are necessary. The determination of the drawable energy $E_L$ of the emergency energy storage and of the internal resistance $R_i$ of the emergency energy storage can take place in different ways. One process is the short-term loading of the emergency energy storage device for a certain time frame and the measurement of the voltage difference before and after the short-term loading and the measurement of the charging current. The energy $E_L$ drawable from the emergency energy storage and the internal resistance $R_i$ of the emergency energy storage are calculated from this. The advantage of the measurement of the drawable energy via a charging process compared to a measurement of the drawable energy via a discharging process has the advantage that the process of measuring via the charging process increases the capacity of the emergency energy storage instead of reducing it with the same level of complexity.

The output drawable from the emergency energy storage is a function of the internal resistance $R_i$. The drawable output is greatest when the load resistance $R_L$ corresponds to the internal resistance $R_i$. Hereby the peak output $P_{max}$ drawable from the emergency energy storage is defined. The drawable peak output $P_{max}$ is proportional to the inverse of the internal resistance $R_i$:

$$P_{max} \propto \frac{1}{R_i}$$

Particularly wind turbine systems and the emergency energy storage used therein can be exposed to extreme temperatures. Low temperatures particularly lead to problems within wind turbine systems. Examples of this is the formation of frost or condensation, which is problematic naturally with electronic equipment. Electronic equipment can not only be indirectly influenced, through low temperatures, but also indirectly, for example from condensation. Thus, in particular the heating typical with electronic power components can lead to strong temperature differences within the electronic devices, whereby mechanical stresses are caused that can damage, for example, soldered points.

The emergency storage elements in the emergency energy storage devices are also essentially influenced by low temperatures. The energy storage elements usually used these days exhibit a strong increase in the internal resistance $R_i$ as the temperature increases. Because a higher internal resistance $R_i$ means higher losses $E_v$, the energy $E_L$ drawable from an emergency energy storage at a low temperature is significantly less than the energy $E_L$ drawable at a higher temperature. The same thing applies to the peak output $P_{max}$ drawable from the emergency energy storage.

In order to ensure sufficient energy $E_L$ drawable from the emergency energy storage, the air in the switch boxes in which the emergency energy storage are located is heated by heating fans before a cold wind turbine system starts operating in the prior art. As soon as the air has reached a preset temperature, for example 5° C., a signal is generated by means of a thermal switch, which indicates the operational readiness of the emergency energy store. This warm-up process is relatively time-consuming and, thus, delays the operational readiness of a wind turbine system significantly. Furthermore, there is a bit of uncertainty regarding the actually removable energy $E_L$, because the air temperature does not necessarily enable a reliable statement to be made regarding the temperature, particularly the core temperature, of the energy storage elements. Thus, operation takes placed frequently with safety margins. For example, the signal that indicates the operational readiness is not generated until the air temperature in the switch box is at 10° C. instead of 5. The reaching of a temperature of 10° C. and the switch box; however, does not guarantee that the emergency energy storage has also assumed this temperature, or at least a temperature at which it reliably functions, or has reached the required minimum energy or a correspondingly low in a resistance, as the heating of the emergency energy storage device naturally follows the heating of the switch box with a time delay. The inclusion of the corresponding safety margins in the calculation further delays the startup of the wind turbine system, which means losses for the operator of the wind turbine system due to the longer downtimes. More serious effects would be feared if the drawable energy $E_L$ were estimated too high by means of the air temperature and the wind turbine system was placed into operation even though the drawable energy $E_L$ had not reached the vane position for an emergency movement of the rotor blades. If the grid fails in this case, the rotor blades remain at least partially in the wind during an emergency, whereby the wind turbine system would go into an overspeed in the event of strong wind and could be damaged.

Thus, the object of the invention is to provide a process for preparing an emergency energy storage for operation, a process for preparing a pitch system for a wind turbine system for operation, and a computer program product, which can also be used at low starting temperature of the emergency energy storage, as well as a pitch system and a wind turbine system, which are also quickly and safely operationally ready, even at a low starting temperature.

The previously derived and indicated object is achieved starting from the previously described process for preparing an emergency energy storage for operation in that the emergency energy storage is discharged via a discharging device in order to use the heat occurring at the internal resistance $R_i$ during discharging of the emergency energy storage to heat the emergency energy store.

The invention makes use of the otherwise disadvantageous effect of the increasing internal resistance $R_i$ at low temperatures in order to heat the emergency energy storage device from the inside through discharging of the emergency energy storage. By heating the emergency energy storage, the internal resistance $R_i$ is lowered. Because the internal resistance $R_i$ is responsible for an essential part of the losses $E_v$, day will likewise reduce with the heating of the emergency energy storage. Accordingly, the peak output $P_{max}$ drawable from the emergency energy storage increases due to the reduction in the internal resistance $R_i$.

The heating of the emergency energy storage here can take place as a function of a measured temperature, for example, the outer temperature of the system or the temperature within a housing in which the emergency energy storage is also housed.

Instead of waiting until the emergency energy storage is heated by external heat sources, such as a heating fan, the emergency energy storage device can be heated exclusively or even additionally from the inside. Alternatively or in addition to a temperature measurements, the internal resistance Ri of the emergency energy storage can be determined and the heating of the emergency energy storage can be made determined depended on the decrease of the threshold of a limit specified for the internal resistance $R_i$ of the emergency energy store.

With an advantageous embodiment of the invention, a provision is that at least one physical variable is measured, which enables a statement to be made regarding the core temperature of an energy storage element or of multiple energy storage elements of the emergency energy storage; the core temperature is calculated based on the physical variable or the physical variables and the discharging of the emergency energy storage which takes place at least until the core temperature has reached a definable temperature threshold. Compared to the methods of determining the air temperature from prior state of the art, this means a significantly more meaningful option for temperature determination. The operational readiness here is then not considered to be specified until the temperature threshold is reached, that is the startup of the emergency energy storage device can then take place.

Alternatively, the emergency energy storage can essentially always be discharged for a fixed time frame, whereby the time frame is selected such that a sufficient heating of the emergency energy storage device is assured. The selected time frame here is dependent on the parameters of the emergency energy storage.

According to a further advantageous embodiment of the invention, a provision is that when calculating the core temperature, aging effects of the emergency energy storage, which change the relationship between the physical variable or the physical variables and the core temperature, are considered. The relationship between the physical variable or the physical variables and the core temperature can change over time and/or with the number of charge/discharge cycles of the emergency energy storage. The type and scope of these changes is commonly known and can, thus, be considered in the calculation of the core temperature, whereby the accuracy of the calculation can also be maintained even with aged emergency energy storage devices.

In an especially advantageous embodiment of the invention, a provision is that the physical variable or the physical variables comprise the capacitance C of the emergency energy storage and/or the internal resistance $R_i$ and of the emergency energy storage. As previously described, the internal resistance $R_i$ shows a significant temperature dependency; thus, starting from the internal resistance $R_i$, the temperature of the emergency energy storage or the energy storage elements can be deduced. Further, the capacitance C is also temperature-dependent and can be applied in a similar manner to determine the temperature of the emergency energy storage or the energy storage elements.

Especially preferably, the energy $E_L$ drawable from the emergency energy storage and/or the peak output $P_{max}$ drawable from the emergency energy storage during discharging is continuously determined. This will assure that the emergency energy storage is only discharged to the extent necessary. Depending on the specific circumstances, the emergency energy storage device can be heated by the discharge process to the extent that sufficient residual energy/residual output is available for emergency operation without repeat charging. Through this measure, it is assured that the operational state is achieved, in the shortest possible time. Alternatively, the discharging of the emergency energy storage can take place for a predefined time frame or until a predefined energy quantity has been drawn from the emergency energy storage.

Preferably, the emergency energy storage is loaded via the discharging device with a load resistance $R_L$, which is less than the internal resistance $R_i$ of the emergency energy storage, particularly no more than half as much as the internal resistance $R_i$, or especially preferably no more than 10% of the internal resistance $R_i$. In this manner, the large part of the energy drawn from the emergency energy storage during discharging is converted into heat at internal resistance $R_i$.

According to an advantageous further embodiment of the invention, a provision is that the emergency energy storage is charged when the redetermination has the result that the energy $E_L$ drawable from the emergency energy storage has not achieved a definable minimum energy value and/or the peak output $P_{max}$ drawable from the emergency energy storage has not achieved a definable minimum output value. In the event that the necessary minimum energy and/or the necessary minimum output cannot be achieved solely through discharging the emergency energy storage, this target or targets can still be achieved through simple charging of the emergency energy storage. The emergency energy storage can be charged, for example, with a predefined energy quantity or up to a predefined level, for a predefined time frame, whereby the level is, especially, at least 80%, or, preferably, at least 90%, and especially, preferably at least 95% of the maximum energy quantity that can be stored in the emergency energy storage device.

In the event that the emergency energy storage only has a very small energy quantity at the start of the process, according to the invention or is even completely discharged, it is advantageous to charge the emergency energy storage device to enable the subsequent discharging of the emergency energy storage. An advantageous embodiment of the invention is characterized by, that before the discharging of the emergency energy store, the emergency energy storage device is charged only by the amount that is necessary, after the discharging of the emergency energy storage, for the purposes of heating the emergency energy storage such that at least as much residual energy is present that the operational readiness is achieved. In order to charge the emergency energy storage a charging device is preferably provided.

The charging device can be formed, for example, by a rectifier that rectifies the alternating current of a providing grid in direct current. In particular, the charging device can also be formed by the energy consumer itself when it has, for example, a motor that can also be operated as a generator and supplied by the energy in the emergency energy storage device.

According to an especially, advantageous further embodiment of the invention, a provision is that the charging of the emergency energy storage device takes place at no more than the maximum permissible charging current of the emergency energy storage. Through this current limitation, the emergency energy storage is protected from overloads and the service life of the emergency energy storage device is increased.

In a preferred embodiment of the invention, a provision is that the discharging device comprises an energy consumer or at least one of the energy consumers. Thus, the one energy consumer or at least one of the energy consumers can function as a load resistor via which the emergency energy storage can be discharged. This means that a separate load resistor, which serves solely to discharge the emergency energy storage, can be dispensed with. If the energy consumer is an electric motor of a pitch system for example, not only can the emergency energy storage be heated via the electric motor during the discharging of the emergency energy store, but simultaneously the electric motor is also heated and, thus, prepared for the pending operation. If a braking resistor, also called a brake chopper, which serves to dissipate excessive energy, is present, said braking resistor can also function as a load resistor.

In a further preferred embodiment of the invention, a provision is that the discharging device has at least one heat resistor, whose waste heat in turn is used for the direct or indirect heating of the emergency energy storage. The heating resistor can be arranged, for example, in the direct vicinity of the emergency energy storage, may be in direct contact with the emergency energy storage, or simultaneously function as a heating resistor of a heating fan. In this way, not only the heat occurring at the internal resistor during discharging of the emergency energy storage is used to heat the emergency energy storage, but also the electrical output converted into heat in the discharging device.

According to a further preferred embodiment of the invention, a provision is that the energy storage elements have capacitors, especially ultra-capacitors. The emergency energy storage devices may have an individual capacitor cell as well as a parallel circuit and/or series circuit of multiple capacitor cells. The capacitance C of the emergency energy storage device characterizes, thus, the resulting total capacitance C of the connected capacitor cells when there are multiple capacitor cells connected to one another.

The term ultra-capacitors comprises electrochemical capacitors having a double-layer capacitance as well as a pseudo-capacitance. Sometimes, the term super-capacitors is used. Depending on which of the two capacitances is predominant, the ultra-capacitors are classified into one of three families. Ultra-capacitors are characterized as electric double-layer capacitors (EDLC), in which the double-layer capacitance predominates. Ultra-capacitors in which the pseudo-capacitance predominates are characterized as pseudo-capacitors. Ultra-capacitors in which the double-layer capacitance and the pseudo-capacitance contribute to the total capacitance C of the ultra-capacitor to about the same degree are characterized as hybrid capacitors. The influence of temperature on the internal resistance $R_i$ is especially significant for capacitors and usually strongest at temperatures less than 0° C.

The capacitance C of the emergency energy storage can be determined, just as the internal resistance $R_i$ of the emergency energy storage through short-term discharging of the emergency energy storage by means of a resistance and the measurement of voltage and the discharging current.

Thus, the energy $E_C$ stored in the emergency energy storage results at:

$$E_C = \frac{1}{2} C U_L^2$$

The charging voltage $U_L$ influencing this calculations is likewise definable through the simplest measurements. The drawable energy $E_L$ can accordingly be calculated with the approximation previously described as follows:

$$E_L = E_C - E_V \approx \frac{1}{2} C U_L^2 - \int_{t_0}^{t_1} R_i I^2(t) dt$$

Further, it is advantageous when the discharge current is limited to a maximum value, wherein particularly the maximum value is selected to be a value less than or equal to the maximum permissible loss output of the discharging device. In this manner, the discharging device is protected from overloads.

With a cold emergency energy storage device, its internal resistance $R_i$, in particular, may be so high that at the start of the discharging process the discharging current is so low that an overload is initially excluded. With the warming emergency energy storage and the associated lowering of the internal resistance $R_i$ of the emergency energy storage, the discharging current can then become so large over time that the loss output at which the load resistance or resistances such as the motor winding of the pitch motor and/or the braking chopper becomes too large. These load resistances are originally for a different purpose and have thus been dimensioned for different loads. According to another preferred further embodiment of the invention, a provision is that the limiting of the discharging current take place by means of a pulse width modulation, wherein particularly the peak discharging current is limited to the maximum permissible pulse current of the current circuit comprising the emergency energy storage and the discharging device. The discharging current here is the resulting current strength averaged over multiple pulses. The peak discharging current characterizes the maximum current strength that a single pulse of the pulse width modulation achieves.

The previously derived and shown object is achieved starting from the previously described process for operational readiness of a pitch system for a wind turbine system as one of the previously described processes is applied to one emergency energy storage device or, at least, to one of the emergency energy storage of the pitch system. The previously derived and shown object is achieved, starting from the previously described pitch system, as the pitch system is designed for implementing the aforementioned process. The previously derived and shown object is achieved, starting from the previously described wind turbine system, as the wind turbine system comprises such a pitch system.

The implementation of the individual process steps of the process, according to the invention, can take place, for example, through a computer program, which is stored on a storage medium such as, for example, a semi-conductor storage, a magnetic storage, or an optical storage, and is processed by means of a control mechanism.

In detail, there are then a multitude of options for designing and further developing the process according to the invention for preparing an emergency energy storage device for operation. To that end, reference is made to the claims dependent on claim 1, as well as to the subsequently detailed description of preferred exemplary embodiments of the invention with reference to the drawing.

Figure 2:
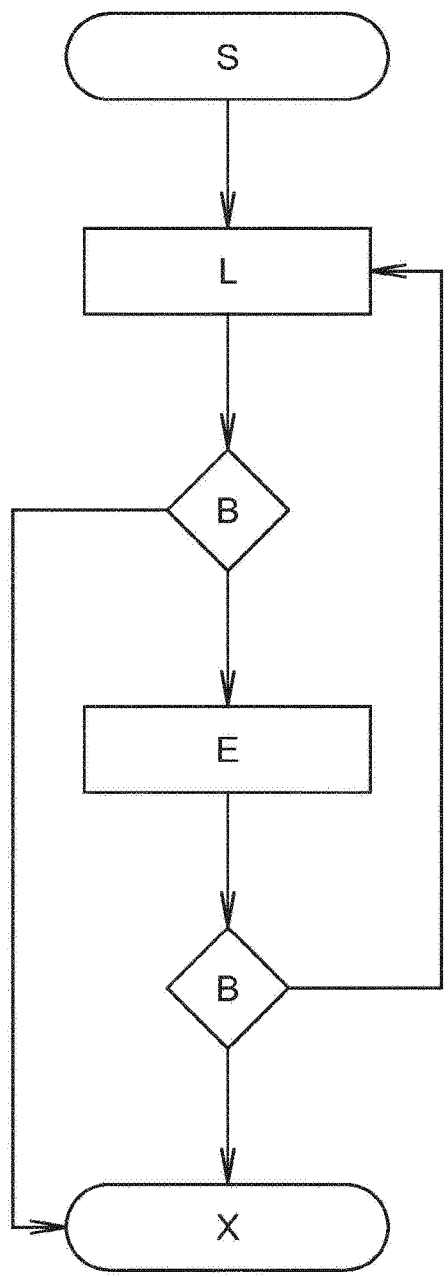
Figure 3:
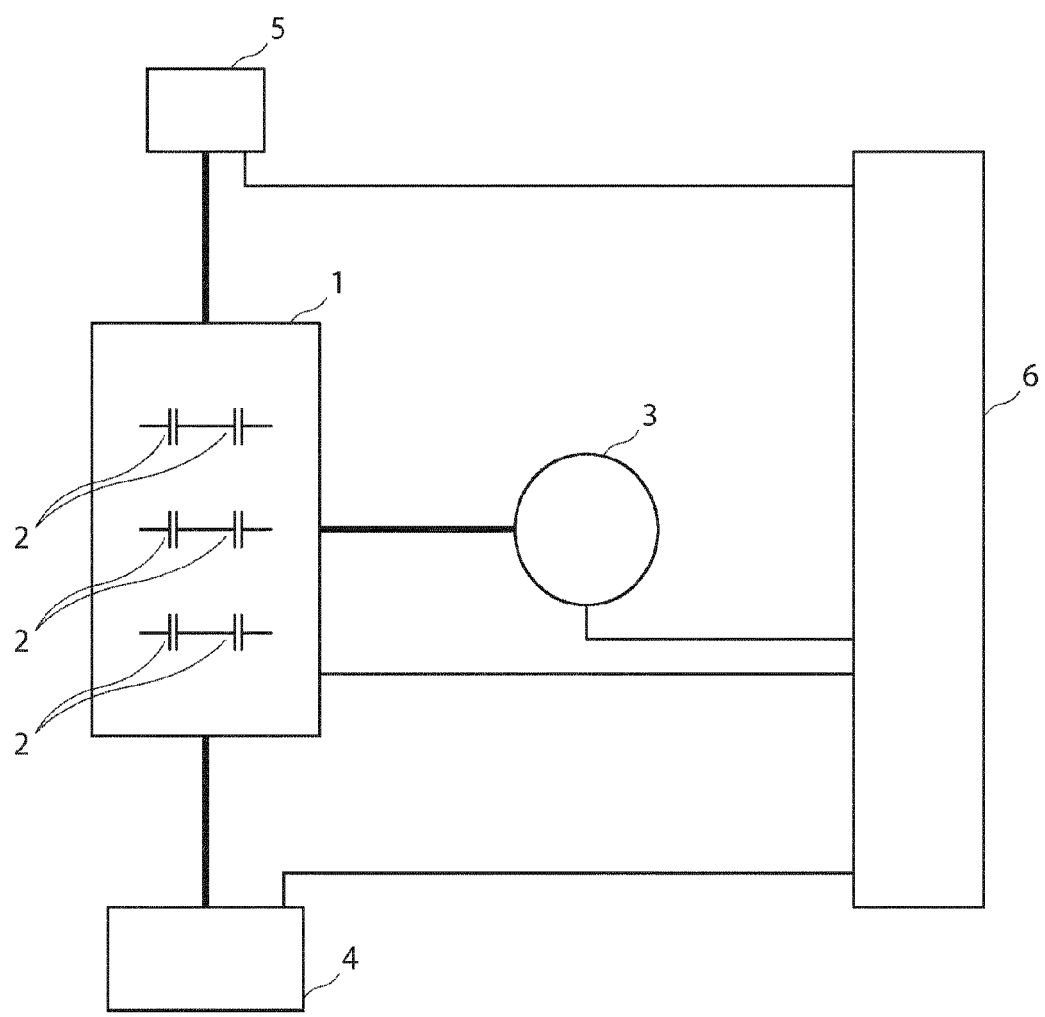

The drawing shows the following:

FIG. 1 schematically shows the connection between the temperature T of an energy storage element and its internal resistance $R_i$, FIG. 2 shows a flowchart of a preferred embodiment of the process according to the invention; and FIG. 3 schematically shows a part of a pitch system according to the invention.

FIG. 1 schematically shows the connection between the temperature T of an energy storage element and its internal resistance $R_i$. To this end, the temperature T has been applied to the y-axis and the internal resistance $R_i$ of an exemplary energy storage device has been applied to the x-axis and the diagram of FIG. 1. It is clearly shown that when the temperature T drops below a certain value, the internal resistance $R_i$ increases greatly. The temperature T from which the internal resistance $R_i$ greatly increases depends on the type of energy storage device. For ultra-capacitors, this temperature T is frequently in the range of 0; depending on the type however, the internal resistance under certain circumstances is sufficient even starting at −15° C., for enabling reliable emergency operation. The temperature, thus, depends on the properties of the selected emergency energy storage and the other dimensioning of the pitch drive and should; therefore, be individually selected for any type.

FIG. 2 shows a flowchart of a preferred embodiment of the process according to the invention. After the start (S) of the process, first to the emergency energy storage is charged (L) in order to ensure that sufficient energy is stored for the subsequent process steps in the emergency energy storage. Said process step can particularly be omitted when it can be assumed that sufficient energy has already been stored for the subsequent process steps in the emergency energy storage device, for example, from a previous start, and the system is placed back into operation after just a brief interruption, for example after maintenance work.

In the next step, the energy $E_L$ drawable from the emergency energy storage and/or the peak output $P_{max}$ drawable from the emergency energy storage is determined (B). The determination of the peak output $P_{max}$ drawable from the emergency energy storage can preferably be carried out by methods that do not require a total discharge of the emergency energy storage. For capacitors used as an emergency energy storage, contrary to chemical emergency energy storage devices, such as lead-acid batteries, there is a direct relationship between the voltage difference at the start and at the end of a partial discharging process and the drawn output such that the stored residual energy can be reliably deduced merely from a discharging time or charging time of a few seconds. As the emergency energy storage was only loaded for a few seconds with the discharging current, there may be sufficient residual energy still present to not require a renewed charging upon a measurement via the discharging process and beyond. Preferably, the capacitance determination; however takes place by means of a charging process so that energy is supplied to the emergency energy storage instead of drawn from the emergency energy storage.

If the determination (B) of the energy $E_L$ drawn from the emergency energy storage and/or the peak output $P_{max}$ drawable from the emergency energy storage is the result of the energy $E_L$ drawable from the emergency energy storage achieving a definable minimum energy value and/or the peak output $P_{max}$ drawable from the emergency energy storage achieving a definable minimum energy value, then the operational readiness is determined (X) and, particularly, a signal is generated to the prioritized control device, whereby the signal indicates the operational readiness.

If the determination (B) results in the energy $E_L$ drawable from the emergency energy storage not achieving a definable minimum energy value and/or the peak output $P_{max}$ drawable from the emergency energy storage not achieving a definable minimum output value, then first the emergency energy storage device is discharged via a discharging device in order to heat up the emergency energy storage by means of its internal resistance $R_i$ (E). Following this, the energy $E_L$ drawable from the emergency energy storage device and/or the peak output $P_{max}$ drawable from the emergency energy storage is determined (B) again. This procedure heats the emergency energy storage device regardless of whether the emergency energy storage has a low temperature or not. This procedure can always be applied when the parameters of the emergency energy storage reliably indicates that the emergency energy storage device cannot overheat due to a one-time discharge. This is always the case when the load resistance is high enough in order to limit the discharging current such that an overheating of the emergency energy storage is excluded. If, for example, the so-called braking chopper is selected as the discharging resistor, then the breaking chopper is not only itself naturally configured to this load but prevents, with a resistance of typically 10 ohm, as is customary for a motor of 7 kW, an overloading of the emergency energies storage, without additional measures being required.

Alternatively, before a decision as to whether the emergency energy storage should first be discharged for heating the emergency energy store (1) by means of its internal resistance $R_i$, or should be started at the same time as the charging without previous discharging, said decision can be made dependent on the temperature dropping below a measured temperature, for example the temperature within the housing in which the emergency energy storage (1) is housed and/or the internal resistance $R_i$ of the emergency energy storage device (1).

Typically, a converter is provided between a grid connection and the motors that provides, for example, an intermediate circuitry voltage of 420 V. In this case, the emergency energy storage is typically arranged on the inverter on the primary side, while the motors and, thus, the potential load resistors are connected to the inverter on the secondary side. Super-capacitors obtainable at the time of the application have, for example, an internal resistance of 0.08 ohm at a temperature of −40° C. With a pitch motor for an output of 7 kW, the resistance of the winding typically is 0.2 ohm. If the bank comprising super-capacitors with the winding of the pitch motor is loaded, a discharging current of approximately 150 A is set at the start of the discharging of the −40° C. cold emergency energy storage device, instead of the permissible 30 A set for the capacitors. The discharging current can the limited to an average of 30 A, based on a pulse width modulation starting at 20%, for example switch-on of the load resistor for a cycle period of the converter and a wait time of four cycle periods until the next switch-on, With a typical application, the switching frequency of the converter may be, for example, 8 kHz such that the winding of the pitch motor is switched on, for example, for 125 µs in an alternating manner and then disconnected from the emergency energy device for a time duration of 500 µs.

Based on a typical heating capacity of a super-capacitor cell of 60 Ws/K and a typical heating resistance of 11 K/W, the core temperature of the super-capacitors with a discharging current of 30 A can be raised by about 30 K, thus, to an operating temperature of −15° C., within 1000 seconds. With the capacitor type selected in this exemplary embodiments, the system can then be placed in operation at this temperature, as the cell has, to a great extent, achieved its original capacitance as well as a sufficiently low internal resistance.

Alternatively, the redetermination (B) can also continuously take place during the discharging (E) such that the two process steps essentially take place in parallel. If the redetermination (B) results in the energy $E_L$ drawn from the emergency energy storage achieving a definable minimum energy value and/or the peak output $P_{max}$ drawable from the emergency energy storage achieving a definable minimum energy value, then the operational readiness is determined (X) and, particularly, a signal is generated to the prioritized control device, whereby the signal indicates the operational readiness.

If the redetermination (B) results in energy $E_L$ drawable from the emergency energy storage not achieving a definable minimum energy value and/or the peak output $P_{max}$ drawable from the emergency energy storage not achieving a definable minimum output value, the emergency energy storage device is charged (L). The charging (L) may take place, for example, until the emergency energy storage is charged at 90%. Subsequently, the energy $E_L$ drawable from the emergency energy storage and/or the peak output $P_{max}$ drawable from the emergency energy storage is determined (B) again.

The loops formed by these steps L, B, E, and B will continue to run until one of the determinations (B) results in the energy $E_L$ drawable from the emergency energy storage achieving a definable minimum energy value and/or the peak output $P_{max}$ drawable from the emergency energy storage achieving a definable minimum output value. Alternatively, the loops can be interrupted after a defined maximum number of runs and an error signal is generated to the control device. Thus, when the emergency energy storage does not have the required minimum energy after 100 loop runs, for example, it can be concluded that the emergency energy storage has reached the end of its service life. With the error signal, a technician can be informed who must then replace the emergency energy storage before the system is placed back into operation.

If the process according to the invention is used, for example, in an application area in which only the energy $E_L$ drawable from the emergency energy storage is relevant and the peak output $P_{max}$ drawable from the emergency energy storage does not play any role, then only the energy $E_L$ drawable from the emergency energy storage is determined (B) and the operational readiness is determined (X), as soon as the energy $E_L$ drawable from the emergency energy storage has reached the specified minimum energy value.

FIG. 3 schematically shows a part of a pitch system according to the invention. The emergency energy storage device (1) has a plurality of energy storage elements (2), which are detailed by the circuit symbols of multiple capacitors in the figure. The emergency energy storage device (1) is connected to this in order to provide electrical emergency energy for an energy consumer (3). Furthermore, the emergency energy storage device (1) is still connected to a discharging device (4) and a charging device (5). The emergency energy storage (1) can be discharged for heating via the discharging device (4). The charging device (5) is used to charge the emergency energy storage device (1). Additionally, a control device (6) is provided, which is set up for processing program instructions for executing the process according to the invention. To this end, a computer program with corresponding program instructions can be stored in a data store of the control device (6). The control device (6) is connected to the remaining components for exchanging control signals via signal lines. For clarification purposes, the components are shown separately in FIG. 3. Within the scope of the invention, two or more components may also be combined into one assembly. A single component can also take on the tasks of multiple components. Thus, an electric motor can simultaneously form the energy consumer (3) the discharging device (4), and even the charging device (5) in the generator operation.

REFERENCE LIST

1 Emergency energy storage
2 Energy storage element
3 Energy consumer
4 Discharging device
5 Charging device
6 Control device

The invention claimed is:

1. A method for preparing for operation an emergency energy storage unit having at least one energy storage element, wherein the emergency energy storage unit is designed to provide emergency electrical energy for at least one energy consumer, the method comprising:
measuring a voltage difference at a start and an end of a partial discharging process of the emergency energy storage unit, the partial discharging process occurring before total discharge of the emergency energy storage unit;
determining a stored residual energy of the emergency energy storage unit based on a relationship of the voltage difference and energy $E_L$ withdrawable from the emergency energy storage unit and/or peak output $P_{max}$ withdrawable from the emergency energy storage unit at a discharging time or charging time, wherein operational readiness emergency energy storage unit is established as soon as the energy $E_L$ withdrawable from the emergency energy storage unit has reached a definable minimum energy value and/or the peak output $P_{max}$ withdrawable from the emergency energy storage unit has reached a definable minimum output value, and if the energy $E_L$ withdrawable from the emergency energy storage unit does not reach a definable minimum energy value and/or the peak output $P_{max}$ withdrawable from the emergency energy storage unit does not reach a definable minimum output value, the emergency energy storage unit is then discharged via a discharging device in order to use the heat generated during the discharging of the emergency energy storage unit at its internal resistance Ri to heat the emergency energy storage unit.

2. The method of claim 1, wherein the energy $E_L$ withdrawable from the emergency energy storage unit and/or the peak output $P_{max}$ withdrawable from the emergency energy storage unit is determined again after discharging the emergency energy storage unit to heat the emergency energy storage unit, and that the emergency energy storage unit is recharged if the redetermination of the energy $E_L$ withdrawable from the emergency energy storage unit and/or the peak output $P_{max}$ withdrawable from the emergency energy storage unit had the result that the energy $E_L$ withdrawable from the emergency energy storage unit did not reach a definable minimum energy value and/or that the peak output $P_{max}$ withdrawable from the emergency energy storage unit did not reach a definable minimum output value.

3. The method of claim 1, wherein the discharging process of the emergency energy storage unit takes place for a specified period of time or that the period of time is redetermined in individual cases for each discharging process.

4. The method of claim 1, wherein the determination of the energy $E_L$ withdrawable from the emergency energy storage unit and/or of the peak output $P_{max}$ withdrawable from the emergency energy storage unit is determined continuously during the discharging.

5. The method of claim 1, wherein before discharging of the emergency energy storage unit, the emergency energy storage unit is charged by an amount such that after the discharging of the emergency energy storage unit to heat the emergency energy storage unit, the energy $E_L$ withdrawable from the emergency energy storage unit and/or the peak output $P_{max}$ withdrawable from the emergency energy storage unit is sufficient for determining the operational readiness.

6. The method of claim 1, wherein the discharging device comprises the one energy consumer or at least one of the energy consumers.

7. The method of claim 1, wherein the discharging current takes place by means of a pulse width modulation, wherein, in particular, the peak discharging current is limited to the maximum permissible pulse current of the current circuit comprising the emergency energy storage unit and the discharging device.

8. The method of claim 1, wherein at least one physical variable that allows for a statement to be made regarding the core temperature of the one energy storage element or of the several energy storage elements of the emergency energy storage unit is measured, the core temperature is calculated based on the physical variable or the physical variables, and the discharging of the emergency energy storage unit takes place at least until the core temperature has reached a definable temperature threshold.

9. The method of claim 8, wherein aging effects of the emergency energy storage unit, change the relationship between the physical variable or the physical variables and the core temperature and are taken into consideration in the calculation of the core temperature.

10. The method of claim 8, wherein the physical variable or the physical variables include the capacitance C of the emergency energy storage unit and/or the internal resistance Ri of the emergency energy storage unit.

11. The method of claim 1, wherein the at least one energy storage element comprises capacitors.

12. The method of claim 1, wherein the emergency energy storage unit having the at least one energy storage element is part of a pitch system for a wind turbine system.

13. A computer program product with program instructions for executing the method of claim 1.

* * * * *